(12) United States Patent
Van Der Burgt

(10) Patent No.: US 11,261,327 B2
(45) Date of Patent: Mar. 1, 2022

(54) THERMOPLASTIC POLYMER COMPOSITION, AN ARTICLE MADE THEREOF AND A PROCESS FOR PREPARING THE SAME

(71) Applicant: DSM IP ASSETS B.V., Heerlen (NL)

(72) Inventor: Frank Peter Theodorus Johannes Van Der Burgt, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 17 days.

(21) Appl. No.: 15/576,464

(22) PCT Filed: May 25, 2016

(86) PCT No.: PCT/EP2016/061774
§ 371 (c)(1),
(2) Date: Nov. 22, 2017

(87) PCT Pub. No.: WO2016/189023
PCT Pub. Date: Dec. 1, 2016

(65) Prior Publication Data
US 2018/0155546 A1   Jun. 7, 2018

(30) Foreign Application Priority Data
May 28, 2015 (EP) .................. 15169541

(51) Int. Cl.
| C08L 77/00 | (2006.01) |
| C08L 77/06 | (2006.01) |
| C08K 3/22 | (2006.01) |
| C08K 5/5313 | (2006.01) |
| C08K 7/14 | (2006.01) |
| C23C 18/16 | (2006.01) |
| C23C 18/31 | (2006.01) |

(52) U.S. Cl.
CPC ................ *C08L 77/06* (2013.01); *C08K 3/22* (2013.01); *C08K 5/5313* (2013.01); *C08K 7/14* (2013.01); *C08L 77/00* (2013.01); *C23C 18/1603* (2013.01); *C23C 18/1667* (2013.01); *C23C 18/31* (2013.01); *C08K 2003/2251* (2013.01); *C08L 2201/02* (2013.01); *C08L 2203/20* (2013.01); *C08L 2205/02* (2013.01); *C08L 2205/06* (2013.01)

(58) Field of Classification Search
CPC ....... C08L 77/06; C08L 2201/02; C08K 3/32; C08K 5/5313; H05K 1/0373
See application file for complete search history.

(56) References Cited

U.S. PATENT DOCUMENTS

| 2004/0241422 | A1 | 12/2004 | Naundorf et al. | |
| 2009/0030124 | A1* | 1/2009 | Yin ......................... | C08K 3/38 524/126 |
| 2009/0292051 | A1 | 11/2009 | Li et al. | |
| 2012/0279764 | A1 | 11/2012 | Jiang et al. | |
| 2014/0066560 | A1 | 3/2014 | Stoppelmann et al. | |
| 2014/0179850 | A1* | 6/2014 | Aepli .................... | C08G 69/14 524/420 |
| 2014/0353543 | A1* | 12/2014 | Wu ......................... | C09K 5/14 252/75 |

FOREIGN PATENT DOCUMENTS

| EP | 2 703 435 | 3/2014 |
| JP | 2100919 | * 9/2009 |
| WO | WO 2009/141799 | 11/2009 |
| WO | WO 2014/203227 | 12/2014 |

OTHER PUBLICATIONS

International Search Report of the ISA for PCT/EP2016/061774, dated Jul. 26, 2016, 2 pages.

* cited by examiner

*Primary Examiner* — Gregory Listvoyb
(74) *Attorney, Agent, or Firm* — Nixon & Vanderhye P.C.

(57) ABSTRACT

The invention relates to a thermoplastic polymer composition comprising A. a polyamide B. a reinforcing agent, and C. an laser direct structuring (LDS) additive wherein the polyamide comprises a blend of —(A.1) a semi-crystalline semi-aromatic polyamide, and —(A.2) an amorphous semi-aromatic polyamide or an aliphatic polyamide, or a mixture thereof; or a blend of —(A.3) a semi-crystalline aliphatic polyamide, and —(A.4) an amorphous semi-aromatic polyamide; and D. a metal (di)phosphinate. The present invention further relates an article prepared form the thermoplastic polymer composition, and article made by a LDS process and a process for preparing the same.

10 Claims, No Drawings

THERMOPLASTIC POLYMER COMPOSITION, AN ARTICLE MADE THEREOF AND A PROCESS FOR PREPARING THE SAME

This application is the U.S. national phase of International Application No. PCT/EP2016/061774 filed May 25, 2016 which designated the U.S. and claims priority to EP Patent Application No. 15169541.8 filed May 28, 2015, the entire contents of each of which are hereby incorporated by reference.

The present invention relates to a thermoplastic polymer composition comprising a polyamide, Laser Direct Structuring (LDS) additive and a reinforcing agent. In particular, the present invention concerns an article prepared form the thermoplastic polymer composition, and article made by an LDS process and a process for preparing the same.

Electrical components may be provided as molded injection devices (MID) with desired printed conductors, i.e., when manufactured in MID technology, using different methods, e.g. a masking method, in two-component injection molding with subsequent electroplating, through laser direct structuring, through coating the back of a film, or through hot stamping. In contrast to conventional circuit boards made of fiberglass-reinforced plastic or the like, MID components manufactured in this way are three-dimensional molded parts having an integrated printed conductor layout and possibly further electronic or electromechanical components. The use of MID components of this type, even if the components have only printed conductors and are used to replace conventional wiring inside an electrical or electronic device, saves space, allowing the relevant device to be made smaller, and lowers the manufacturing costs by reducing the number of assembly and contacting steps.

It is becoming increasingly popular to form MIDs using a laser direct structuring (LDS) process. Laser Direct Structuring (LDS) is a process that enables an injection molded article to be selectively plated with metal to form discrete conductive circuit paths. First, a plastic article is injection molded using a polymer compound formulated specifically for this process. The article is then activated with a laser in the desired pattern, thereby activating the surface of the article in the areas traced with the laser. The article then undergoes an electroless plating process with a metal such as copper, nickel or gold; with the resulting circuit paths conforming exactly to the laser pattern.

In the LDS process a computer-controlled laser beam travels over the MID to activate the plastic surface at locations where the conductive path is to be situated. With a laser direct structuring process, it is possible to obtain small conductive path widths (such as of 150 microns or less). In addition, the spacing between the conductive paths may also be small. As a result, MIDs formed from this process save space and weight in the end-use applications. One advantage of the Laser Direct Structuring (LDS) process is the ability to have a circuit path following the contour of the injection molded article, thus applying a true 3D circuit path. By integrating the circuit directly onto the plastic article, the designer now has freedoms previously unavailable. These design freedoms allow article consolidation, weight reduction, miniaturization, reduced assembly time, improved reliability and overall system cost reduction. Another advantage of laser direct structuring is its flexibility. If the design of the circuit is changed, it is simply a matter of reprogramming the computer that controls the laser.

Key markets and applications for the Laser Direct Structuring process include medical, automotive, aerospace, military, RF antennas, sensors, security housings and connectors.

US 2009/0292051 A1 describes laser direct structuring materials with a high dielectric constant to be used in e.g. antennas. The compositions described in US 2009/0292051 A1 comprise a thermoplastic resin, an LDS additive and a ceramic filler. As reinforcement fillers glass fibers and boron nitride are mentioned amongst others. As ceramic filler TiO2 is used.

US2012/0279764 discloses a thermoplastic composition that is capable of being used in a laser direct structuring process to provide enhanced plating performance and good mechanical properties. The compositions of that invention include a thermoplastic base resin, a laser direct structuring additive and a white pigment. The pigments comprise TiO2 and materials chosen from the group of anastase TiO2, rutile TiO2, ZnO, BaSo4 and BaTiO3. The laser direct structuring additive is a heavy metal mixture oxide spinel, such as copper chromium oxide spine; a copper salt, such as copper hydroxide, copper phosphate, copper sulfate, cuprous thiocyanate; or a combination. These materials exhibited a synergistic effect with the laser active table additive as well as to improve the plating performance of the LDS composition.

US 20040241422 discloses a method to produce conductive tracks disposed on an electrically non-conductive support material by depositing a metallized layer on metal nuclei produced by using electromagnetic radiation to break up electrically non-conductive metal compounds dispersed in the support material, and a method for producing them. The electrically non-conductive metal compounds are insoluble spinel-based inorganic oxides which are thermally stable and are stable in acidic or alkaline metallization baths, and which are higher oxides which are thermally stable and are stable in acidic or alkaline metallization baths, and which are higher oxides with a spinel structure, and which remain unchanged in non-irradiated areas. The spinel based inorganic oxides used are heat resistant and remain stable after being subjected to soldering temperatures. The conductor tracks are reliably and easily produced and adhere strongly to the support.

Thermoplastic compositions comprising a laser direct structuring additive are also known from WO14203227. WO14203227 describes compositions comprising a thermoplastic resin, a laser direct structuring (LDS) additive and a flame retardant. In addition to enabling the composition to be used in a laser direct structuring process, the LDS additive used herein is also selected to enhance the flame retardant characteristics of the composition. The composition has a UL94 V0 rating at a thickness of 1.6 mm. To impart additional impact strength fillers are used e.g. TiO2, boron-nitride or glass fibers, amongst many other materials. The thermoplastic resin can in principle be any thermoplastic polymer, but in particular is selected from polycarbonate or a polycarbonate/acrylonitrile-butadiene-styrene resin blend, or a combination including at least one of the foregoing polycarbonate-based resins. The flame retardant is an organic phosphate and/or an organic compound containing phosphorus-nitrogen bonds, for example resorcinol tetraphenyl diphosphate (RDP).

US2014066560 discloses polyamide compositions comprising glass fiber reinforcing agents and an LDS additive, such as a Cu2CrO4. The composition of US2014066560 was aimed for MID technology applied on moulded articles having good mechanical properties, in particular having high rigidity, high tear strength and good impact toughness. For that purpose glass fibers with non-circular cross-section were used. The polyamide in the composition of US2014066560 may comprise different polyamides, which may consist of a blend of different polyamides. The composition may further contain conventional additives such as adhesion promoters, halogen-containing flame retardants, halogen-free flame retardants, different types of stabilizers, conductive additives, carbon black, optical brighteners, processing aids, nucleation agents, crystallization accelerators, crystallization retarders, flow aids, lubricants, release agents, plasticizers, pigments, dyes, markers, and mixtures thereof.

The problem with LDS compositions is that the LDS additive gives rise to embrittlement of fiber reinforced compositions, resulting in lowering the notched impact and tensile elongation. The current additives for LDS materials are usually spinel based metal oxide (such as copper chromium oxide), organic metal complexes such as palladium complexes or copper complexes, however, there are some limitations based on these additives. For organic metal complexes, usually relatively higher loadings are required to obtain sufficiently dense nucleation for rapid metallization when activated by laser radiation Others, like the spinel based metal oxides, adversely affect the mechanical properties of fiber reinforced materials, in particular the elongation at break and impact performance. It has also been observed by the inventors that additives like TiO2, which are claimed to have a synergistic effect on the LDS additive as well as on the plating performance of the LDS composition, can have a detrimental effect on the elongation at break and impact performance of fiber reinforced polymer compositions. On the other hand, it was experienced by the inventors that addition of impact modifiers to fiber reinforced LDS polyamide compositions resulted in a better performance for the elongation at break and impact, however, had a very negative effect on the plating performance of the LDS composition.

There is a need for materials with good or even improved LDS performance, while retaining reasonable mechanical properties.

An object of the present invention therefor is to provide a reinforced thermoplastic polyamide composition capable of being used in a laser direct structuring process with improved LDS properties, with retention of good mechanical properties, in particular retention of elongation at break and impact.

According to the invention this object is reached by the features of claim 1.

The thermoplastic composition of the present invention comprises a polyamide (component A), a reinforcing agent (component B) and a Laser Direct Structuring (LDS) additive (component C). Herein the polyamide (A) comprises a blend of at least two polyamides, and the composition further comprises a metal salt of phosphinic acid or diphosphinic acid, or any polymer thereof, or any mixture thereof (component D).

The effect of the composition according to the invention is a synergistic effect, resulting in an improved LDS performance, while at the same time the mechanical properties of the composition are retained at a good level. One of the aspects of the LDS process with the composition according to the invention is that under identical plating conditions a thicker plating metal layer is obtained or in achievement of a certain layer thickness in a shorter time and/or under less energy demanding conditions.

In one embodiment of the invention, the composition comprises a blend of at least two polyamides, comprising
(A.1) a semi-crystalline semi-aromatic polyamide, and
(A.2) an amorphous semi-aromatic polyamide (a.2.i) or an aliphatic polyamide (a.2.ii), or a mixture of (a.2.i) and (a.2.ii).

In another embodiment of the invention, the composition comprises a blend of at least two polyamides, comprising
(A.3) a semi-crystalline aliphatic polyamide and
(A.4) an amorphous semi-aromatic polyamide.

With the term semi-crystalline polyamide is herein understood a polyamide that has crystalline domains as demonstrated by the presence of a melting peak with melting enthalpy of at least 5 J/g. With the term amorphous semi-aromatic polyamide is herein understood a polyamide that has no crystalline domains or essentially so, as demonstrated by absence of a melting peak or the presence of a melting peak with melting enthalpy of less than 5 J/g. Herein the melting enthalpy is expressed relative to the weight of the polyamide.

The semi-crystalline semi-aromatic polyamide (A.1) in the polyamide composition according to the invention includes at least one semi-aromatic polyamide which is thermoplastic and has a melting temperature and has been derived from at least one monomer containing at least one aromatic group. The semi-crystalline semi-aromatic polyamide may consist of one semi-aromatic polyamide or of a mixture of different semi-crystalline semi-aromatic polyamides, which may be one or more homopolymers, copolymers, terpolymers, or higher polymers.

It is preferred that for the semi-crystalline semi-aromatic polyamide used in the present invention about 10 to about 75 mole % of the monomers contain aromatic groups. Accordingly, preferably about 25 to about 90 mole % of the monomers are aliphatic or cylcoaliphatic compounds. When more than one semi-crystalline semi-aromatic polyamide is used, the amount refers to the total of the semi-crystalline semi-aromatic polyamides. More preferably about 20 to about 55 mole % of these monomers contain aromatic groups. Herein the mole % is relative to the total molar amount of monomeric units in the semi-crystalline semi-aromatic polyamide polyamide.

Examples of suitable monomers containing aromatic groups are terephthalic acid and its derivatives, isophthalic acid and its derivatives, naphthalene dicarboxylic acid and its derivatives, C6-C20 aromatic diamines, p-xylylenediamine and m-xylylenediamine. Preferably, the semi-crystalline semi-aromatic polyamide has been derived from monomers containing terephthalic acid and its derivatives.

The semi-crystalline semi-aromatic polyamide can further contain one or more different monomers, either aromatic, aliphatic or cycloaliphatic. Examples of aliphatic or cylcoaliphatic compounds from which the semi-aromatic polyamide may further be derived include aliphatic and cycloaliphatic dicarboxylic acids and its derivatives, aliphatic C4-C20 alkylenediamines and/or C6-C20 alicyclic diamines, and amino acids and lactams. Suitable aliphatic dicarboxylic acids are, for example, adipic acid, sebacic acid, azelaic acid and/or dodecanedioic acid. Suitable diamines include butanediamine, hexamethylenediamine; 2 methylpentamethylenediamine; 2-methyloctamethylenediamine; trimethylhexamethylene-diamine; 1,8-diaminooctane, 1,9-diaminononane; 1,10-diaminodecane and 1,12-diaminododecane. Examples of suitable lactams and amino acids are 11-aminododecanoic acid, caprolactam, and laurolactam.

Examples of preferred semi-crystalline semi-aromatic polyamides include poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T), hexamethylene adipamide/hexamethylene terephthalamide/hexamethylene isophthalamide copolyamide (polyamide 6,6/6,T/6,I), poly(caprolactam-hexamethylene terephthalamide) (polyamide 6/6,T), hexamethylene terephthalamide/hexamethylene isophthalamide (6,T/6,I) copolymer, polyamide 10,T/10,12, polyamide 10T/10,10 and the like.

Preferably, the semi-crystalline semi-aromatic polyamide is a polyphthalamide, represented by the notation PA-XT or PA-XT/YT, wherein the polyamide is built from repeat units derived from terephthalic acid (T) and one or more linear aliphatic diamines. Suitable example thereof are PA-8T, PA-9T, PA-10T, PA-11T, PA5T/6T, PA4T/6T, and any copolymers thereof. Preferably, the polyphthalamide is selected from the group consisting of PA-9T, PA-10T and PA-11T, or any combination thereof.

The semi-crystalline semi-aromatic polyamide (A.1) has a melting temperature which suitably is around 280° C., or above. Preferably the melting temperature (Tm-A.1) is at least 270° C., more preferably at least 280° C., and still more preferably in the range of 280-350° C., or even better 300-340° C. Thus the composition will be better capable to withstand more severe SMT conditions. A higher melting temperature can generally be achieved by using a higher content in terephthalic acid and/or shorter chain diamines in the polyamide. The person skilled in the art of making polyamide molding compositions will be capable of making and selecting such polyamides.

Suitably, the semi-crystalline semi-aromatic polyamide (A.1) has a melting enthalpy of at least 15 J/g, preferably at least 25 J/g, and more preferably at least 35 J/g. Herein the melting enthalpy is expressed relative to the weight of the semi-crystalline semi-aromatic polyamide (A.1).

With the term melting temperature is herein understood the temperature, measured by the DSC method according to ISO-11357-1/3, 2011, on pre-dried samples in an N2 atmosphere with heating and cooling rate of 10° C./min. Herein Tm has been calculated from the peak value of the highest melting peak in the second heating cycle. With the term melting enthalpy is herein understood the measured by the DSC method according to ISO-11357-1/3, 2011, on pre-dried samples in an N2 atmosphere with heating and cooling rate of 10° C./min. Herein the melting enthalpy is measured from the integrated surface below the melting peak(s). With the term glass transition temperature (Tg) is herein understood the temperature, measured by the DSC method according to ISO-11357-1/2, 2011, on pre-dried samples in an N2 atmosphere with heating and cooling rate of 10° C./min. Herein Tg has been calculated from the value at the peak of the first derivative (with respect of time) of the parent thermal curve corresponding with the inflection point of the parent thermal curve.

In a preferred embodiment of the invention, semi-crystalline semi-aromatic polyamide (A.1) has a number average molecular weight (Mn) of more than 5,000 g/mol, preferably in the range of 7,500-50,000 g/mol, more preferably 10,000-25,000 g/mol. This has the advantage that the composition has a good balance in mechanical properties and flow properties.

The amorphous semi-aromatic polyamide (a.2.i), as well as the amorphous semi-aromatic polyamide (A.4) in the polyamide composition according to the invention, includes at least one semi-aromatic polyamide which is thermoplastic and has been derived from at least one monomer containing at least one aromatic group. The amorphous semi-aromatic polyamide may consist of one semi-aromatic polyamide or of a mixture of different amorphous semi-aromatic polyamides, which may be one or more homopolymers, copolymers, terpolymers, or higher polymers.

It is preferred that for the amorphous semi-aromatic polyamide (a.2.i) respectively (A.4) used in the present invention about 10 to about 75 mole % of the monomers contain aromatic groups. Accordingly, preferably about 25 to about 90 mole % of the monomers are aliphatic or cylcoaliphatic compounds. When more than one amorphous semi-aromatic polyamide is used, the amount refers to the total of the amorphous semi-aromatic polyamides. More preferably about 20 to about 55 mole % of these monomers contain aromatic groups. Herein the mole % is relative to the total molar amount of monomeric units in the amorphous semi-aromatic polyamide.

Examples of monomers containing aromatic groups that can be suitably used in the amorphous polyamide are isophthalic acid and its derivatives. Isophthalic acid, as well as its derivatives, can be suitably used in combination with terephthalic acid and its derivatives and/or naphthalene dicarboxylic acid and its derivatives, with aliphatic diamines as well as with C6-C20 aromatic diamines, p-xylylenediamine and m-xylylenediamine. For the monomers containing aromatic groups also terephthalic acid and its derivatives and/or naphthalene dicarboxylic acid can be used, preferably in combination with one or more branched aliphatic diamines.

Examples of suitable amorphous semi-aromatic polyamides are PA-XI, wherein X is an aliphatic diamine, such as PA-6I, PA-8I; amorphous copolyamides of PA-6I or PA-8I, such as PA-6I/6T or PA-8I/8T (for example PA-6I/6T 70/30); Preferably, the amorphous semi-aromatic polyamide comprises, or consists of amorphous PA-6I/6T.

The aliphatic polyamide (a.2.ii) in the LDS composition according to the invention, may be derived from aliphatic and/or alicyclic monomers such as one or more of adipic acid, sebacic acid, azelaic acid, dodecanedioic acid, or their derivatives and the like, aliphatic C4-C20 alkylenediamines, alicyclic diamines, lactams, and amino acids. Suitable diamines include bis(p-aminocyclohexyl)methane; butanediamine, hexamethylenediamine; 2-methylpentamethylenediamine; 2-methyloctamethylenediamine; trimethylhexamethylenediamine; 1,8-diaminooctane; 1,9-diaminononane; 1,10-diaminodecane; 1,12-diaminododecane. Suitable lactams or amino acids include 11-aminododecanoic acid, caprolactam, and laurolactam.

Suitable aliphatic polyamides include for example polyamide 6; polyamide 6,6; polyamide 4,6; polyamide 4,8, polyamide 4,10, polyamide 6,10; polyamide 6,12; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; and polyamide 6,13; and any mixtures and copolymers thereof.

Preferably, the aliphatic polyamide (2.a.ii) comprises polyamide 6,6, polyamide 4,6, or polyamide 4,8 or polyamide 4,10, polyamide-4,12, polyamide 6,10 or PA-6,12 or any mixture or copolymer thereof. More preferably, the aliphatic polyamide (a.2.ii) comprises, or consists of PA-410, PA-412, PA-610 or PA-612, or any combination thereof.

The aliphatic polyamide (2.a.ii) suitably is a semi-crystalline aliphatic polyamide having a melting temperature of at least 220° C., and preferably in the range of 250-300° C.

The semi-crystalline aliphatic polyamide (A.3) is suitably a semi-crystalline aliphatic polyamide selected from one or more of the aliphatic polyamide (a.2.ii) described above. Preferably, the semi-crystalline aliphatic polyamide (A.3) comprises polyamide 6,6, polyamide 4,6, or polyamide 4,8 or polyamide 4,10, polyamide-4,12, polyamide 6,10 or PA-6,12 or any mixture or copolymer thereof. More preferably, the aliphatic polyamide (A.3) comprises, or consists of PA-46, PA-66 or PA-410, or any combination thereof.

In a preferred embodiment of the invention, the blend of thermoplastic polyamides has a number average molecular weight (Mn) of more than 10,000 g/mol, and less than 100,000 g/mol. Preferably Mn is in the range of 12,000-50,000 g/mol, more preferably 15,000-25,000 g/mol.

The thermoplastic polyamides (A.1) and (A.2) are suitably present in a combined amount of 30-80 wt. %, relative to the total weight of the composition. For example, (A.1) and (A.2) are present in a combined amount of 40 wt. %, 50 wt. %, 60 wt. %, relative to the total weight of the composition. (A.1) and (A.2) may also be present in different ratio's depending, for example, on the required level of mechanical properties and thermal properties. Suitably, the weight ratio (A.1):(A.2) is in the range of 90:10-10:90, preferably 80:20-20:80, more preferably 70:30-30:70. A larger amount of (A.1) is more favorable for retention of good mechanical properties at elevated temperature, whereas a larger amount of (A.2) is more favorable for a higher elongation at break and/or impact behavior at room temperature.

In a particular embodiment (A.2) may comprise a mixture of amorphous semi-aromatic polyamide (A.2.1) and aliphatic polyamide (A.2.2). Suitably these polyamides are used in a weight ratio (A.2.1):(A.2.2) in the range of 90:10-10:90, preferably 80:20-20:80, more preferably 70:30-30:70.

The thermoplastic polyamides (A.3) and (A.4) are suitably present in a combined amount of 30-80 wt. %, relative to the total weight of the composition. For example, (A.3) and (A.4) are present in a combined amount of 40 wt. %, 50 wt. %, 60 wt. %, relative to the total weight of the composition. (A.3) and (A.4) may also be present in different ratio's depending, for example, on the required level of mechanical properties and thermal properties. Suitably, the weight ratio (A.3):(A.4) is in the range of 90:10-10:90, preferably 80:20-20:80, more preferably 70:30-30:70. A larger amount of (A.3) is more favorable for retention of good mechanical properties at elevated temperature, whereas a larger amount of (A.4) is more favorable for a higher elongation at break and/or impact behavior at room temperature.

The polyamide composition according to the invention comprises a reinforcing agent (B). Herein the reinforcing agent suitable comprises fibers (B.1) or fillers (B.2) or a combination thereof, more particular fibers and fillers consisting of inorganic material. Examples of thereof include the following fibrous reinforcing materials: glass fibers, carbon fibers, and mixtures thereof. Examples of suitable inorganic fillers that the composition may comprise, include one or more of glass beads, glass flakes, kaolin, clay, talc, mica, wollastonite, calcium carbonate, silica and potassium titanate.

Fibers are herein understood to be materials having an aspect ratio L/D of at least 10. Suitably, the fibrous reinforcing agent has an L/D of at least 20. Fillers are herein understood to be materials having an aspect ratio L/D of less than 10. Suitably, the inorganic filler has an L/D of less than 5. In the aspect ratio L/D, L is the length of an individual fiber or particle and D is the diameter or width of an individual fiber or particle.

The reinforcing agent is suitably present in an amount in the range of 5-60 wt. %, relative to the total weight of the composition. Suitably, the amount of (B) is in a more restricted range of 10-50 wt. %, more particular 20-40 wt. %, relative to the total weight of the composition.

In a special embodiment of the present invention, the component (B) in the composition comprises 5-60 wt. % of a fibrous reinforcing agent (B.1) having an L/D of at least 20 and 0-55 wt. % of an inorganic filler (B.2) having an L/D of less than 5, wherein the combined amount of (B.1) and (B.2) is 60 wt. % or less, wherein the weight percentages are relative to the total weight of the composition.

Preferably, component (B) comprises a fibrous reinforcing agent (B.1) and optionally an inorganic filler (B.2), wherein the weight ratio (B.1):(B.2) is in the range of 50:50-100:0.

Also preferably, the reinforcing agent comprises, or even consists of glass fibers. In a particular embodiment the composition comprises 5-60 wt. %, of glass fibers, more particular 10-50 wt. %, even more particular 20-40 wt. %, relative to the total weight of the composition.

In addition to the blend of thermoplastic polyamides (A.1) and (A.2) mentioned above and the reinforcing agent (B), the composition of the present invention comprises a laser direct structuring (LDS) additive (C).

For the LDS process, the goal is the production of a conductive path on a molded part through formation of a laser etched surface, and formation of a plated metal layer during a subsequent plating process. The conductive path can be formed by electroless plating process e.g. by applying a standard process, such as a copper plating process. Other electroless plating processes that may be used include, but are not limited to, gold plating, nickel plating, silver plating, zinc plating, tin plating or the like. In such a process laser radiation activates the polymer surface for the subsequent plating process. When an article comprising an LDS additive is exposed to the laser, its surface is activated. Without being bound by a theory, it seems that during activation with the laser metal complexes break down to metal nuclei. The laser draws a circuit pattern onto the part and leaves behind a roughened surface containing embedded metal particles. These particles act as nuclei for the plating process and enable adhesion of the metallization layer in metallization process. Plating rate and adhesion of the plated layer are key evaluation requirements.

The LDS additive is selected to enable the composition to be used in a laser direct structuring process. In an LDS process, an article made of the thermoplastic composition comprising the LDS additive is exposed to a laser beam to activate metal atoms from the LDS additive at the surface of the thermoplastic composition. As such, the LDS additive is selected such that, upon exposure to a laser beam, metal atoms are activated and exposed and in areas not exposed to the laser beam, no metal atoms are exposed. In addition, the LDS additive is selected such that, after being exposed to a laser beam, the etching area is capable of being plated to form conductive structure. As used herein "capable of being plated" refers to a material wherein a substantially uniform metal plating layer can be plated onto a laser-etched area and show a wide process window for laser parameters.

Examples of LDS additives useful in the present invention include, but are not limited to, spinel based metal oxides and copper salts, or a combination including at least one of the foregoing LDS additives. Examples of suitable copper salts are copper hydroxide phosphate, copper phosphate, copper sulfate, cuprous thiocyanate. Spinel based metal oxides are generally based on heavy metal mixtures, such as in copper chromium oxide spinel, e.g. with formula CuCr2O4, nickel ferrite, e.g. spinel with formula NiFe2O4, zinc ferrite, e.g. spinel with formula ZnFe2O4, and nickel zinc ferrite, e.g. spinel with formula $Zn_xNi_{(1-x)}Fe2O4$ with x being a number between 0 and 1.

In a preferred embodiment, the LDS additive is a heavy metal mixture oxide spinel, more particular a copper chromium oxide spinel or a nickel zinc ferrite, or a combination thereof. Suitably, the nickel zinc ferrite is a spinel with formula $Zn_xNi_{(1-x)}Fe2O4$ with x being a number in the range of 0.25-0.75.

The LDS additive (C) is suitably present in amount in the range of 1.0-10 wt. %. More particular, the amount is in the range from 2 to 9.5 wt. %, or in the range of 3 to 9 wt. %, or even 4 to 8.5 wt. %, relative to the total weight of the composition.

Next to the blend of thermoplastic polyamides (A.1) and (A.2), the reinforcing agent (B), and the laser direct structuring (LDS) additive (C), the composition of the present invention comprises a metal salt of phosphinic acid or diphosphinic acid, or any polymer thereof, or any mixture thereof (Component D). These metal salts of phosphinic acid or diphosphinic acid, or any polymer thereof, or any mixture thereof, are herein also referred to as metal salts of (di) phosphinic acids, or even shorter as metal (di)phosphinates.

Suitable metal salts of (di)phosphinic acids that can be used in the composition according to the present invention are, for example, a phosphinate of the formula (I), a disphosphinate of the formula (II),

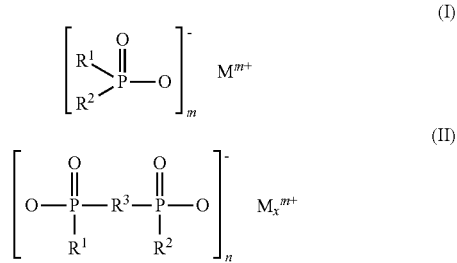

or polymers of these wherein $R^1$ and $R^2$ may be identical or different and are linear or branched $C_1$-$C_6$ alkyl and/or aryl; $R^3$ is linear or branched $C_1$-$C_{10}$-alkylene, $C_6$-$C_{10}$-arylene, -alkylarylene or -arylalkylene; M is one or more of calcium ions, magnesium ions, aluminum ions and zinc ions, m is 2 or 3; n is 1 or 3; x is 1 or 2. $R^1$ and $R^2$ may be identical or different and are preferably methyl, ethyl, n-propyl, isopropyl, n-butyl, tert-butyl, n-pentyl and/or phenyl. $R^3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably chosen to be an aluminum ion or zinc ion. These compounds are disclosed in U.S. Pat. No. 6,255,371 which is hereby incorporated herein by reference.

Preferred metal (di)phosphinates are aluminum methylethylphosphinate and/or aluminum diethylphosphinate, more preferably aluminum diethylphosphinate. The advantage of the metal (di)phosphinates comprising or consisting of an aluminium salt of (di)phosphinic acid is that the plating rate of the LDS process is further enhanced resulting in thicker metal layers in the same time or in achievement of a certain layer thickness in even shorter time or less energy demanding conditions. A further advantage is that the synergistic effect on the LDS properties is already achieved at a very low amount of the metal (di)phosphinate.

The component (D) is suitably present in an amount in the range 1-15 wt. %, relative to the total weight of the composition. An amount less than 1 wt. % will have too little effect on the LDS properties. An amount more than 15 wt. % is possible, but will have limited additional effect on the LDS properties and limit the amount of reinforcing agent that can be included. Preferably, the amount of (D) is in the range 2-12 wt. %, more preferably 3-10 wt. % relative to the total weight of the composition.

The composition according to the invention may optionally comprise one or more further components (E). The additives of component (E) that may be added to the composition may be flame retardant synergists, other polymers as well as any auxiliary additives well known by one skilled in the art such as acid scavengers, plasticizers, stabilizers (such as, for example, thermal stabilizers, oxidative stabilizers or antioxidants, light stabilizers, UV absorbers and chemical stabilizers), processing aids (such as, for example, mold release agents, nucleating agents, lubricants, blowing agents), pigments and colorants (such as carbon black, other pigments, dyes), antistatic agents, suitable to improve other properties. An example of a suitable flame retardant synergist is zinc borate. By the term "zinc borate" is meant one or more compounds having the formula $(ZnO)_x(B_2O_3)_y(H_2O)_z$.

Suitably, the amount of (E) is in the range of 0-30 wt. %. Correspondingly, the sum of (A), (B), (C) and (D) suitably is at least 70 wt. %. Herein all the weight percentages (wt. %) are relative to the total weight of the composition.

The total amount of other components (E) can be, for example, about 1-2 wt. %, about 5 wt. %, about 10 wt. %, or about 20 wt. %. Preferably, the composition comprises at least one other component, and the amount of (E) is in the range of 0.5-10 wt. %, more preferably 1-5 wt. %. Correspondingly, (A), (B), (C) and (D) are present in a combined amount in the range of 90-99.5 wt. %, respectively 95-99 wt. %.

The components (A)-(D) in the composition according to the invention are suitably present in the following amounts:
(A) 30-80 wt. % of a combined amount of thermoplastic polyamides (A.1) and (A.2);
(B) 5-60 wt. % of reinforcing agent;
(C) 1-10 wt. % of LDS additive
(D) 1-15 wt. % of metal (di)phosphinate.
Herein the sum of (A), (B), (C) and (D) is at most 100 wt. %.

More particular component (B) in this composition suitably comprises (B.1) 5-60 wt. % of a fibrous reinforcing agent having an L/D of at least 20 and (B.2) 0-55 wt. % of an inorganic filler having an L/D of less than 5.

In a preferred embodiment, the composition according to the invention consists of
- (A) 30-70 wt. % of a combined amount of thermoplastic polyamides (A.1) and (A.2);
- (B) 10-50 wt. % of reinforcing agent;
- (C) 1-10 wt. % of LDS additive;
- (D) 1-15 wt. % of metal (di)phosphinate;
- (E) 0-30 wt. % of one or more further components.

Herein the sum of (A), (B), (C), (D) and (E) is 100 wt. %.

More particular component (B) in this composition suitably comprises a fibrous reinforcing agent (B.1) and optionally an inorganic filler (B.2), wherein the weight ratio (B.1):(B.2) is in the range of 50:50-100:0.

The compositions according to the invention can be prepared by a process, wherein the semi-crystalline semi-aromatic polyamide, the amorphous semi-aromatic polyamide and/or the aliphatic polyamide, the reinforcing agent, the LDS additive, the metal (di)phosphinate and optional additional ingredients are melt-blended. Part of the materials may be mixed in a melt-mixer, and the rest of the materials may then be added and further melt-mixed until uniform. Melt-blending may be carried out using any appropriate method known to those skilled in the art. Suitable methods may include using a single or twin-screw extruder, blender, kneader, Banbury mixer, molding machine, etc. Twin-screw extrusion is preferred, particularly when the process is used to prepare compositions that contain additives such as flame retardants, and reinforcing agent. The compositions of the present invention may be conveniently formed into a variety of articles using injection molding, rotomolding and other melt-processing techniques.

The present invention also relates an molded article prepared form the thermoplastic polymer composition according to the invention comprising a blend of polyamide, a Laser Direct Structuring (LDS) additive, a reinforcing agent, a metal (di)phosphinate and optionally further components, as well as an article made by a LDS process and a process for preparing the same.

The composition used in the article can be any composition according to the invention, and any preferred or specific or particular embodiment thereof as described herein above.

More particular, the molded article can be either:
- an article as molded, wherein the thermoplastic composition is capable of being plated after being activated using a laser; or
- a molded article comprising an activated pattern on the molded article, obtained by laser treatment and capable of being plated to form a conductive path after being activated by the laser treatment;
- a molded article comprising a plated metal pattern thereon forming a conductive path obtained by metal plating after activating by the laser treatment.

In addition, the present invention also provides an article of manufacture comprising a molded article having an activated pattern thereon. The molded articles made of the composition according to the invention and comprising a semi-crystalline semi-aromatic polyamide with a melting temperature of at least 270° C. are in particular useful in SMT applications among others. The articles disclosed in present application can be used in the field of medical, automotive, aerospace applications, and include RF antennas, sensors, connectors and housings for electronic devices, for example housings and frames for notebooks, mobile phones and PC tablets.

The invention is further illustrated with the following examples and comparative experiments.

Raw Materials

PA-1 semi-crystalline semi-aromatic polyamide: PA-4T/66 copolymer, Tm=320° C., Mn around 10,000 g/mol, Mw around 20,000 g/mol PA-2 semi-crystalline semi-aromatic polyamide: PA-10T PA-3 semi-crystalline aliphatic polyamide: PA-410

Glass fibers standard grade for polyamides, 10 micrometer diameter

LDS additive Cu/CrOx-spinel

Metal (di)phosphinate Exolit OP1230, aluminum diethyl phosphinate

Impact modifier Fusabond A560, Ethylene-acryl type impact modifier

EXAMPLES

The compositions of Example I and Comparative Example A-D, shown in Table 1 and 2 were prepared by melt-blending with the constituting components on a Werner & Pfleiderer ZE-25 twin screw extruder using a 330° C. flat temperature profile. The constituents were fed via a hopper, glass fibers were added via a side feed. Throughput was 20 kg/h and screw speed was 200 rpm. The settings typically resulted in a measured melt temperature between about 320 and about 350° C. The polymer melt was degassed at the end of the extruder. The melt was extruded into strands, cooled and chopped into granules.

Injection Molding of Test Bars

Dried granulate material was injection molded in a mold to form test bars with a thickness of 4 mm conforming ISO 527 type 1A for tensile testing, ISO 179/1 eU for unnotched Charpy testing, ISO 179/1 eA for notched Charpy testing and ISO 75 for HDT testing. The temperature of the melt in the injection molding machine was 340° C. for Comparative Experiments A-B, and 310° C. for Comparative Experiments C-D and Example 1. The temperature of the mold was 120° C. The test bars were used to measure the mechanical properties of the compositions. All tests were carried out on test bars dry as made. The compositions and main test results have been collected in Tables 1 and 2.

LDS Performance

The LDS behavior was tested with a 20 W laser, applying different power levels ranging from 50% to 90% of the maximum laser power (max 20 W) and different pulsing frequencies (60 kHz, 80 kHz and 100 kHz), with a laser spot size of 40 μm diameter. Plating was done with a standard Ethone Plating bath with Cu only with a plating time of 10 minutes. Plating thickness was measured with 300 micron diameter X-ray beam, averaged over 3 different measurements for each of the process conditions. Results are given in Table 3.

TABLE 1

Compositions and test results for compositions of Comparative Experiment A (without LDS additive) and Comparative Experiment B (with LDS additive)

| | Experiment/Composition (wt. %) | |
| --- | --- | --- |
| | CE-A | CE-B |
| PA-1 | 70 | 65 |
| Glass Fibers | 30 | 30 |
| LDS additive | 0 | 5 |

TABLE 1-continued

Compositions and test results for compositions of
Comparative Experiment A (without LDS additive) and
Comparative Experiment B (with LDS additive)

| | Experiment/Composition (wt. %) | |
|---|---|---|
| | CE-A | CE-B |
| Properties | | |
| Tensile Modulus (MPa) | 11000 | 10486 |
| Tensile Strength (MPa) | 180 | 127 |
| Elongation at Break (%) | 2.0 | 1.32 |

TABLE 2

Compositions and test results for compositions with LDS additive
of Example-I (with metal (di)phosphinate); Comparative Experiment
C (without metal (di)phosphinate) and Comparative Experiment D
(without metal (di)phosphinate, with impact modifier).

| | Experiment/Composition (wt. %) | | |
|---|---|---|---|
| | CE-C | EX-I | CE-D |
| PA-2 | 31.5 | 29 | 29 |
| PA-3 | 31.5 | 29 | 29 |
| LDS additive | 7 | 7 | 7 |
| Glass fibers | 30 | 30 | 30 |
| Metal (di)phosphinate | | 5 | |
| Impact modifier | | | 5 |
| Properties | | | |
| Tensile modulus (Dry as molded) (MPa) | 9754 | 9999 | 9086 |
| Tensile Strength (MPa) | 141 | 130 | 123 |
| Elongation at Break (%) | 2.12 | 2.24 | 2.62 |
| Flexural modulus (Dry as molded) | 7415 | 7687 | 6840 |
| Flexural Strength (MPa) | 203.9 | 191.1 | 184.7 |
| Flexure at break (%) | 2.94 | 2.78 | 3.09 |
| Charpy [kJ/m2] | 29.8 | 36.3 | 45.7 |
| Notched Charpy [kJ/m2] | 3.8 | 3.9 | 5.9 |
| Notched Charpy [kJ/m2] @ 1 mm from 150 × 150 × 1 mm plaques | 5.57 | 6.12 | 7.89 |
| Spiral flow @ 1 mm 1000 bars | 113 | 106 | 115 |
| Plating Thickness | Ref. 100% | +(30-40%) | −(30-40%) |

TABLE 3

Test results in term of average plating thickness (in
micrometer) from plating tests at different power levels
and different frequencies after 10 minutes plating for
Comparative Experiments C and D and Example I.

| | 50% | 60% | 70% | 80% | 90% |
|---|---|---|---|---|---|
| CE-C | | | | | |
| 60 kHz | 0.0 | 0.6 | 1.3 | 2.1 | 2.0 |
| 80 kHz | 0.0 | 0.5 | 1.2 | 1.9 | 2.0 |
| 100 kHz | 0.0 | 0.2 | 1.2 | 1.5 | 1.7 |
| EX-I | | | | | |
| 60 kHz | 0.09 | 1.17 | 1.85 | 2.23 | 2.01 |
| 80 kHz | 0.11 | 1.08 | 1.81 | 2.10 | 2.00 |
| 100 kHz | 0.0 | 0.8 | 1.7 | 2.1 | 2.0 |
| CE-D | | | | | |
| 60 kHz | 0.0 | 0.2 | 0.9 | 1.4 | 1.2 |
| 80 kHz | 0.0 | 0.1 | 1.0 | 1.3 | 1.1 |
| 100 kHz | 0.0 | 0.0 | 0.9 | 1.0 | 1.0 |

Table 1 shows the negative impact of LDS additive on the mechanical properties. The compositions of Comparative Experiments B and C comprising the LDS additive have a much lower elongation at break and impact resistance than Comparative Experiment A not comprising the LDS additive.

Tables 2 and 3 show the synergistic effect of the composition according to the invention on the LDS properties and the mechanical properties. The composition of Example-I according to the present invention shows at least the same elongation at break and impact resistance and a much better than LDS performance than Comparative Experiment D, on average resulting in a 30 to 40% larger plating layer thickness, whereas the composition of Comparative Experiment E, comprising an olefinic impact modifier, showing a much better elongation at break and impact resistance, but at the same time an even worse LDS performance than, Comparative Experiment D, on average resulting in a 30 to 40% thinner plating layer thickness. Thus, the effect of the composition according to the invention is a synergistic effect, resulting in an improved LDS performance, while at the same time the mechanical properties of the composition are retained at a good level.

The invention claimed is:

1. A thermoplastic polymer composition comprising:
   (A) 30-80 wt. % of a polyamide comprised of a blend of the following thermoplastic polyamide components (A.1) and (A.2):
   (A.1) a semi-crystalline semi-aromatic polyamide, and
   (A.2) an amorphous semi-aromatic polyamide, an aliphatic polyamide or a mixture thereof,
   (B) 5-60 wt. % of a reinforcing agent,
   (C) 1-10 wt. % of a laser direct structuring (LDS) additive, and
   (D) 1-10 wt. % of a metal (di)phosphinate, wherein the metal is aluminum, zinc or a combination thereof, wherein
   the thermoplastic polyamide components (A.1) and (A.2) are present in a weight ratio (A.1):(A:2) in a range of 80/20-20/80, and wherein
   component (A.1) is a polyphthalamide homopolymer PA-XT or a polyphthalamide copolyamide PA-XT/YT comprising at least two aliphatic diamines (X, Y), and wherein
   the sum of components (A), (B), (C) and (D) is at most 100 wt. %, and the weight percentages (wt. %) are relative to total weight of the thermoplastic polymer composition.

2. The thermoplastic polymer composition according to claim 1, wherein component (A.2) comprises an aliphatic polyamide selected from the group consisting of PA-410, PA-412, PA-610, PA-612 and combinations thereof.

3. The thermoplastic polymer composition according to claim 1, wherein the reinforcing agent (B) comprises an inorganic fibrous reinforcing agent, an inorganic filler or a combination thereof.

4. The thermoplastic polymer composition according to claim 1, wherein the composition further comprises (E) at least one additional component in an amount of 0.5-15 wt. %, relative to the total weight of the composition.

5. A molded article which comprises the thermoplastic polymer composition according to claim 1, wherein the thermoplastic polymer composition is capable of being plated after being activated using a laser.

6. A molded article which comprises the thermoplastic polymer composition according to claim 1, wherein the molded article comprises an activated pattern on the molded article which is obtained by laser treatment and capable of being plated to form a conductive path after being activated by the laser treatment.

7. A molded article which comprises the thermoplastic polymer composition according to claim 1, wherein the molded article comprises a plated metal pattern thereon forming a conductive path obtained by metal plating after being activated by a laser treatment.

8. An article of manufacture comprising the molded article according to claim 7.

9. The article of manufacture according to claim 8, wherein the article of manufacture is selected from the group consisting of RF antennas, sensors, connectors for electronic devices, housings for electronic devices and frames for electronic devices.

10. The article of manufacture according to claim 9, wherein the article of manufacture is a housing or a frame for notebooks, mobile phones and/or personal computer (PC) tablets.

* * * * *